United States Patent [19]

Kong

[11] Patent Number: 5,781,619
[45] Date of Patent: Jul. 14, 1998

[54] METHOD OF AUTOMATICALLY PRINTING OUT RAPID KEY LABELS FOR FACSIMILE MACHINE

[75] Inventor: Tae-Ho Kong, Gumi, Rep. of Korea

[73] Assignee: SamSung Electronics Co., Ltd., Suwon, Rep. of Korea

[21] Appl. No.: 777,760

[22] Filed: Dec. 30, 1996

[30] Foreign Application Priority Data

Dec. 30, 1995 [KR] Rep. of Korea ............... 1995-67760

[51] Int. Cl.$^6$ ..................................... H04M 11/00
[52] U.S. Cl. ................. 379/100.14; 358/400; 358/401; 358/402
[58] Field of Search ............... 379/100.14, 100.01, 379/100.08, 100.09, 354–357, 93.18, 93.23; 358/400, 401, 442, 402

[56] References Cited

U.S. PATENT DOCUMENTS 5,199,063  3/1993  Erickson et al. .............. 379/100.14
5,425,096  6/1995  Okada ............................ 379/355
5,509,067  4/1996  Murata ........................... 379/355

*Primary Examiner*—Wing F. Chan
*Attorney, Agent, or Firm*—Robert E. Bushnell, Esq.

[57] ABSTRACT

There is disclosed a method for automatically printing out a rapid key label for a facsimile machine having a telephone/facsimile number memory unit storing data of letters for rapid key dialing, and a font memory unit managing letters for the data. The method includes the steps of storing a predetermined receiving party's name corresponding to his telephone number stored in the telephone/facsimile number memory unit according to performance of the rapid key dialing; and reading out the letters for the data of letters for rapid key dialing that are stored in the telephone/facsimile number memory unit in response to a command to retrieve stored data so as to print them out on paper.

10 Claims, 3 Drawing Sheets

| RAPID KEY NO. | TELEPHONE/FACSIMILE NO | NAME | RAPID KEY LABEL |
|---|---|---|---|
| 1 | 9P0546530977 | HOME | (HOME) |
| 2 | 00181368785434 | JAPAN | (JAPAN) |
| 3 | 00224567895432 | USE SAMSUNG | (USA S) |
| . | ... | ... | |

| RAPID KEY NO | TELEPHONE/ FACSIMILE NO | NAME |
|---|---|---|
| 1 | 9P0546530977 | HOME |
| 2 | 00181368785434 | JAPAN |
| 3 | 00224567895432 | USE SAMSUNG |
| ⋮ | ⋮ | ⋮ |

| RAPID KEY NO. | TELEPHONE/FACSIMILE NO | NAME | RAPID KEY LABEL |
|---|---|---|---|
| 1 | 9P0546530977 | HOME | HOME |
| 2 | 00181368785434 | JAPAN | JAPAN |
| 3 | 00224567895432 | USE SAMSUNG | USA S |
| . | ... | ... | |

METHOD OF AUTOMATICALLY PRINTING OUT RAPID KEY LABELS FOR FACSIMILE MACHINE

CLAIM OF PRIORITY

This application makes claims all benefits accruing under 35 U.S.C. §119 from an application for METHOD OF AUTOMATICALLY PRINTING OUT RAPID KEY LABELS FOR FACSIMILE MACHINE earlier filed in the Korean Industrial Property Office on 30 Dec. 1995 and there duly assigned Ser. No. 67760/1995.

BACKGROUND OF THE INVENTION

1. Field of the Invention

The present invention relates to a method of automatically printing out rapid key labels for a facsimile machine. More particularly, it relates to a method of automatically printing out rapid key labels used to allow easy identification of each rapid key.

2. Description of the Related Art

A conventional facsimile machine has offered rapid key dialing, which is a quick and convenient way of dialing done by pressing one rapid key assigned to the full number of a receiving party stored previously in the facsimile machine for automatic dialing. Each strip of rapid key labels is attached above the appropriate row of the rapid keys in order to allow easy identification of the respective rapid keys corresponding to the names or numbers of receiving parties. Accordingly, users have suffered the trouble of making each strip of rapid key labels and attaching it every time they assign rapid key numbers to the full facsimile numbers.

SUMMARY OF THE INVENTION

It is an object of the present invention to provide a method of automatically printing out rapid key labels of a facsimile machine attached above appropriate rapid keys by using the names and facsimile numbers of receiving parties stored in the facsimile machine for automatic dialing.

In order to realize the above object, the present invention provides a method for automatically printing out a rapid key label for a facsimile machine having a telephone/facsimile number memory unit storing data of letters for rapid key dialing, and a font memory unit managing letters for the data. The method includes the steps of storing a predetermined receiving party's name corresponding to his telephone number stored in the telephone/facsimile number memory unit according to performance of the rapid key dialing; and reading out the letters for the data of letters for rapid key dialing that are stored in the telephone/facsimile number memory unit in response to a command to retrieve stored data so as to print them out on paper.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Reference will now be made in detail to the preferred embodiment of the present invention, examples of which are illustrated in the accompanying drawings.

Figures 1, 2:
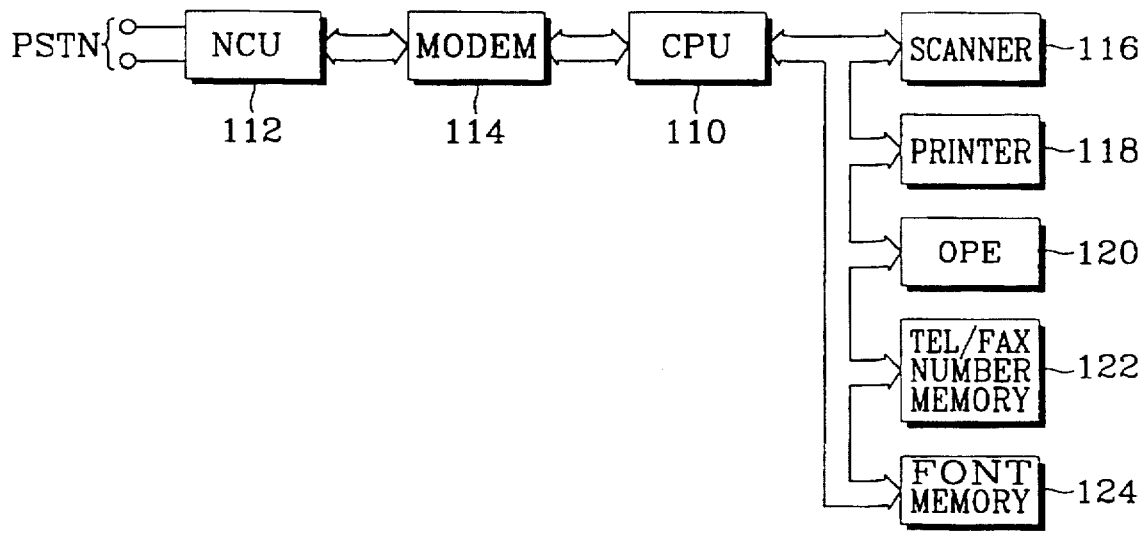
FIG. 1 is a block diagram of a facsimile machine constructed in accordance with the present invention.
FIG. 2 shows a memory map of the present invention.

FIG. 1 is a block diagram of a facsimile machine constructed in accordance with the present invention.

As shown in FIG. 1, the facsimile machine includes a central processing unit 110 which controls the overall operations of the facsimile machine according to a selected mode's program once a transmission, reception or copy mode is established, a network control unit (NCU) 112 which establishes a communication path between a public switched telephone network (PSTN) and a modulator/demodulator (modem) 114 under the control of CPU 110, the modem 114 which can perform either modulation or demodulation with respect to analog signals from NCU 112 and digital signals from CPU 110 under the control of CPU 110, and a scanner 116 that scans an incoming document during a transmission or copy mode into corresponding electrical signals to supply them to CPU 110.

The facsimile machine also includes a printer 118 that prints out the input image data on paper under the control of CPU 110, an operation panel (OPE) 120 that consists of a key matrix having a set of numeric keys and panel keys used for selecting various special functions and providing key input to CPU 110, a number memory unit 122 which stores telephone/facsimile numbers and names of receiving parties and speed dial numbers for rapid key dialing in the form of keyed-in data, and a font memory unit 124 that manages letters corresponding to the key input stored in the number memory unit 122 and from which letters corresponding to the keyed-in data may be retrieved when there is a command to print out appropriate rapid key labels.

FIG. 2 shows a memory map of the present invention, in which the telephone/facsimile numbers and names of receiving parties and speed dial numbers necessary for printing rapid key labels automatically are stored in the form of keyed-in data.

Figure 3:
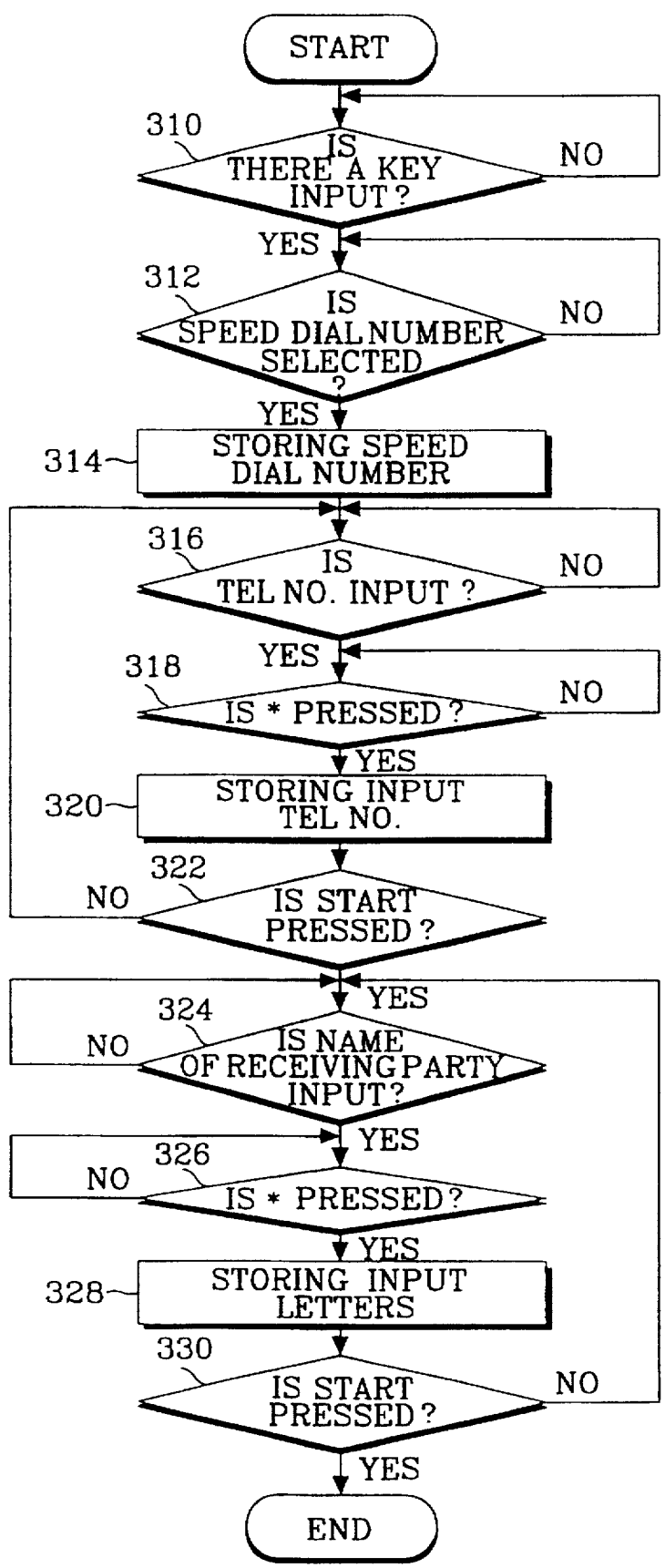
FIG. 3 is a flow chart for storing the names and telephone/facsimile numbers of receiving parties in the facsimile machine according to the present invention.

FIG. 3 is a flow chart for storing the names and telephone/facsimile numbers of receiving parties in the facsimile machine according to the present invention.

The number/name storing procedure includes the steps of when a command to set a rapid key for the full number of a receiving party is keyed in, storing an input speed dial number corresponding to the rapid key, and storing the input full facsimile number/name of the receiving party with respect to the rapid key.

Figures 4, 5:
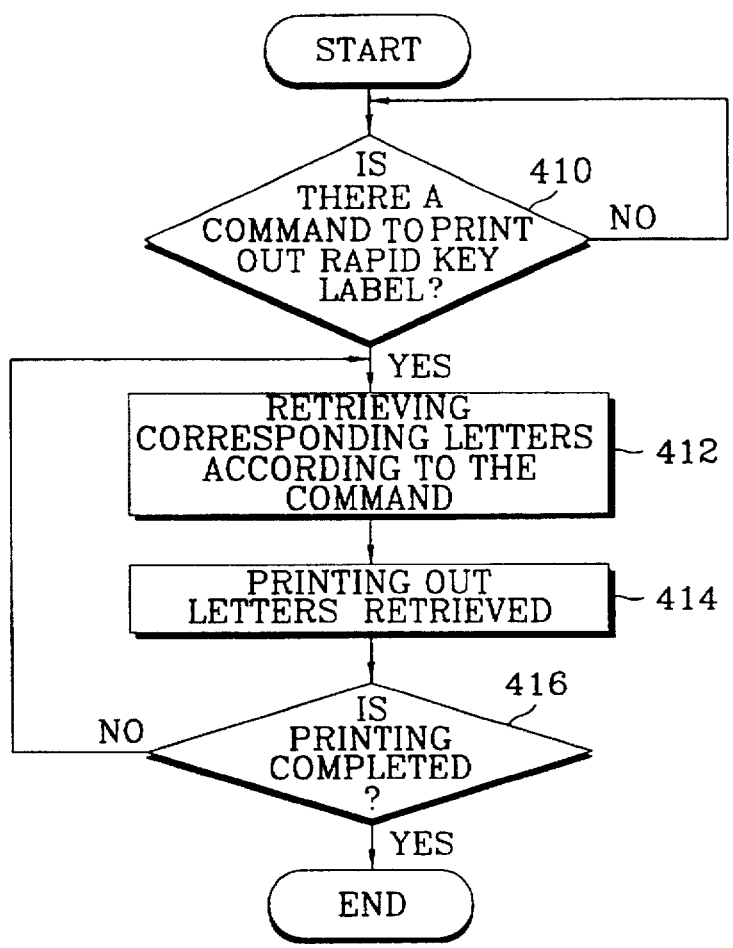
FIG. 4 is a flow chart for automatically printing out rapid key labels according to the present invention.
FIG. 5 shows a rapid key label list finally printed out on paper according to the present invention.

FIG. 4 is a flow chart for automatically printing out rapid key labels according to the present invention.

When a command to print out a rapid key label is keyed in, the appropriate full telephone/facsimile number and rapid key assigned to the number together with the name of a receiving party are printed out.

The following description relates to the first preferred embodiment of the present invention.

Referring first to FIG. 1 and FIG. 3, CPU 110 senses (S310) if there is a key input for establishing a memory dial number storing mode from OPE 120. When there is the key input, CPU 110 carries out the memory dial number storing mode.

During the mode, CPU 110 senses (S312) if numeric keys on OPE 120 for a speed dial number are pressed. When CPU 110 detects the input of the speed dial number, it goes to step 314, and stores the number in the number memory unit 122 as shown in FIG. 2.

After that, CPU 110 determines (S316) if the full telephone/facsimile number for the speed dial number is input from OPE 120. When CPU 110 detects the input of the full number, it goes to step 318 to sense if there is a key input of "*" which serves as a recording key. CPU 110 allows the full telephone/facsimile number input at step 316 to be stored in number memory unit 122 as shown in FIG. 2, and then determines (S322) if a key input of START exists as a mark of completion of telephone/facsimile number recording. When there is no key input of START, CPU 110 goes to step 316, and stores the input telephone/facsimile number. When CPU 110 determines that the key input of START exists, it goes to step 324 to sense if data of letters for the name are input to the facsimile machine. When CPU 110 detects (S324) that the data are input according to a predetermined letter list, it goes to step 326 to sense if there is a key input of "*". When CPU 110 detects the key input of "*", it stores (S328) in number memory 122 the letters for the name that are input at step 324 as shown in FIG. 2, and then senses (S330) if the key input of START exists as a mark of completion of letter recording.

When CPU 110 detects that there is no key input of START, it goes to step 324 to store the input letters for a rapid key label. When there is the key input of START, CPU 110 completes the number/name storing procedure.

TABLE 1 is an example of the letter list.

TABLE 1

| Pressing | 1 | 2 | 3 | 4 | 5 | 6 | 7 | 8 | 9 | 0 | # |
|---|---|---|---|---|---|---|---|---|---|---|---|
| Once | 1 | 2 | 3 | 4 | 5 | 6 | 7 | 8 | 9 | 0 | # |
| Twice | Q | A | D | G | J | M | P | T | W | + | : |
| Three times | Z | B | E | H | K | N | R | U | X | * | / |
| Four times | – | C | F | I | L | O | S | V | Y | , | . |

*Recording key and START: Completion key

The following description concerns storing a Japanese branch's telephone number "00181368785434" and name "Japan" of a Japanese branch, with reference to TABLE 1.

First, the telephone number is stored by pressing numeric keys for the full number plus country and area codes and recording key "*", and storing the telephone number is completed by pressing START.

The name of the receiving party may be stored using the numeric keys. In other words, letter "J" is stored by key input of "*" after pressing twice "5" on OPE 120. "A" is stored by pressing twice "2" and "*". Storing the name is completed by pressing START.

The following description relates to a method of automatically printing out the appropriate rapid key label.

Referring to FIG. 1 and FIG. 4, CPU 110 senses (S410) if a command to request data on the corresponding speed dial number is input from OPE 120. When CPU 110 detects that there is the command to request the data, it goes to step 412. CPU 110 reads (S412) out of font memory unit 124 letters corresponding to the data retrieved from number memory unit 122.

Font memory unit 124 stores the data in accordance with the procedure of TABLE 1. If reading the letters out of font memory unit 124 is completed, the letters are printed out (S414 and S416) by printer 118. A rapid key label list that is finally printed out on paper is shown in FIG. 5.

As described above, in addition to rapid key dialing, the present invention may offer the function of automatically printing out rapid key labels to be attached above appropriate rapid keys for easy identification of each rapid key according to a user's request, which can save the user the trouble of making rapid key labels with his own hands.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a facsimile machine which includes telephone/facsimile number storing means for storing data corresponding to letters for rapid key dialing, and printing means for printing said data in response to rapid key dialing of said letters, a method for automatically printing out a rapid key label comprising the steps of:

storing at least one predetermined receiving party's name corresponding to his telephone number in said telephone/facsimile number storing means in accordance with performance of the rapid key dialing;

entering a command to retrieve the stored data in order to print out the stored data on paper;

providing a print out paper having a first region for receiving a listing of the stored data including a rapid key number, a corresponding telephone number, and a corresponding receiving party's name, and a second region to which a label is adhered for receiving one of the receiving party's name and an abbreviated version of the receiving party's name; and responding to the command to retrieve the stored data by printing the rapid key number, the corresponding telephone number and the corresponding receiving party's name in the first region, and by printing one of the receiving party's name and an abbreviated version of the receiving party's name in the second region.

2. A method according to claim 1, wherein letters for the receiving party's name are stored by pressing corresponding numeric keys a predetermined number of times.

3. A method according to claim 2, wherein said facsimile machine includes font storing means for storing letters of at least one font for printing out said data, and wherein a letter that is retrieved from among the letters stored in said font storing means is determined by the number of times a predetermined key is pressed by the user.

4. A method according to claim 1, wherein said facsimile machine includes font storing means for storing letters of at least one font for printing out said data, and wherein a letter that is retrieved from among the letters stored in said font storing means is determined by the number of times a predetermined key is pressed by the user.

5. A method according to claim 1, wherein said storing step comprises:

determining whether there is a key input;

if there is a key input, determining whether a speed dial number has been selected;

if a speed dial number has been selected, storing said speed dial number;

determining whether a telephone number has been input;

if a telephone number has been input, determining whether a predetermined key has been pressed;

if the predetermined key has been pressed, storing said telephone number input;

determining whether an additional predetermined key has been pressed;

if said additional predetermined key has been pressed, determining whether the receiving party's name has been input;

if the receiving party's name has been input, determining whether said predetermined key has been pressed;

if said predetermined key has been pressed, storing input letters corresponding to the receiving party's name;

determining whether said additional predetermined key has been pressed; and if said additional predetermined key has been pressed, terminating the storing step.

6. A method according to claim 1, wherein said storing step comprises:

determining whether the receiving party's telephone number has been stored;

if the receiving party's telephone number has been stored, determining whether the receiving party's name has been input;

if the receiving party's name has been input, determining whether a predetermined key has been pressed;

if said predetermined key has been pressed, storing input letters corresponding to the receiving party's name;

determining whether an additional predetermined key has been pressed; and if said additional predetermined key has been pressed, terminating the storing step.

7. A method according to claim 6, wherein said responding step comprises:

determining whether the command to retrieve the stored data has been received;

if the command to retrieve the stored data has been received, retrieving letters corresponding to the rapid key number, the corresponding telephone number and the corresponding receiving party's name, and printing them in the first region;

if the command to retrieve the stored data has been received, retrieving letters corresponding to one of the receiving party's name and an abbreviated version of the receiving party's name, and printing them in the second region;

determining whether printing is completed; and if printing is completed, terminating the responding step.

8. A method according to claim 7, wherein said facsimile machine includes font storing means for storing letters of at least one font for printing out said data, and wherein said retrieving steps comprise retrieving said corresponding letters from said font storing means in accordance with a specified one of said at least one font.

9. A method according to claim 1, wherein said responding step comprises:

determining whether the command to retrieve the stored data has been received;

if the command to retrieve the stored data has been received, retrieving letters corresponding to the rapid key number, the corresponding telephone number and the corresponding receiving party's name, and printing them in the first region;

if the command to retrieve the stored data has been received, retrieving letters corresponding to one of the receiving party's name and an abbreviated version of the receiving party's name, and printing them in the second region;

determining whether printing is completed; and if printing is completed, terminating the responding step.

10. A method according to claim 9, wherein said facsimile machine includes font storing means for storing letters of at least one font for printing out said data, and wherein said retrieving steps comprise retrieving said corresponding letters from said font storing means in accordance with a specified one of said at least one font.

* * * * *